US010819091B2

(12) United States Patent
Eisele

(10) Patent No.: US 10,819,091 B2
(45) Date of Patent: Oct. 27, 2020

(54) SNAP ADAPTER FOR TOOL COMPONENT

(71) Applicant: Ripley Tools, LLC, Cromwell, CT (US)

(72) Inventor: Will Eisele, New Britain, CT (US)

(73) Assignee: Ripley Tools, LLC, Cromwell, CT (US)

( * ) Notice: Subject to any disclaimer, the term of this patent is extended or adjusted under 35 U.S.C. 154(b) by 334 days.

(21) Appl. No.: 15/719,908

(22) Filed: Sep. 29, 2017

(65) Prior Publication Data
US 2018/0123330 A1    May 3, 2018

Related U.S. Application Data

(60) Provisional application No. 62/415,608, filed on Nov. 1, 2016.

(51) Int. Cl.
*H02G 1/12*  (2006.01)
*B23B 41/00*  (2006.01)
*B23B 35/00*  (2006.01)

(52) U.S. Cl.
CPC .......... *H02G 1/1207* (2013.01); *B23B 35/00* (2013.01); *B23B 41/003* (2013.01); *H02G 1/1212* (2013.01); *B23B 2228/41* (2013.01)

(58) Field of Classification Search
CPC .......................... H02G 1/1207; B23B 2228/41; B23B 41/003; B23B 35/00
USPC ................... 29/758, 759, 760, 828, 868–873
See application file for complete search history.

(56) References Cited

U.S. PATENT DOCUMENTS

| 4,736,501 | A  | * | 4/1988  | Fujimoto | H01R 43/28 |
| | | | | | 29/33 F |
| 4,777,712 | A  | * | 10/1988 | Dyck | H02G 1/1231 |
| | | | | | 29/566.4 |
| 5,511,305 | A  | * | 4/1996  | Garner | H02G 1/1226 |
| | | | | | 29/828 |
| 5,630,341 | A  | * | 5/1997  | Hoffa | H02J 3/14 |
| | | | | | 81/9.51 |
| 6,370,759 | B1 | * | 4/2002  | Shimizu | H02G 1/1265 |
| | | | | | 29/33 M |
| 6,725,533 | B1 | * | 4/2004  | Losinger | H01R 43/28 |
| | | | | | 29/270 |
| 7,694,420 | B2 | * | 4/2010  | Ehret | H02G 1/1224 |
| | | | | | 30/90.1 |
| 9,831,649 | B1 | * | 11/2017 | Gretz | H02G 3/088 |

(Continued)

*Primary Examiner* — Peter Dungba Vo
*Assistant Examiner* — Kaying Kue
(74) *Attorney, Agent, or Firm* — DeLio Peterson & Curcio; Peter W. Peterson

(57) ABSTRACT

A snap adapter for a wire stripping tool has a hollow body with a tool end, a component end, and a button. The tool end is sized for insertion into the tool body and the component end is sized for receiving a component meant to strip a cable of a specified diameter. The button comprises a pin feature for attaching the received component. Inserting the component into the snap adapter forces the pin away from the snap adapter hollow body to allow for full insertion of the component into the tool body. A spring disposed between the hollow body and button pushes the pin feature upwards through the hollow body to hold the component inside the snap adapter once the component is fully inserted. Removing the component requires pushing down the button to extract the pin feature, which allows the component to be slideably removed from the tool body.

8 Claims, 5 Drawing Sheets

(56) References Cited

U.S. PATENT DOCUMENTS

2010/0064857 A1\* 3/2010 Vaccaro ............... H02G 1/1224
  81/9.4
2017/0040783 A1\* 2/2017 Troy .................... H02G 1/1226

\* cited by examiner

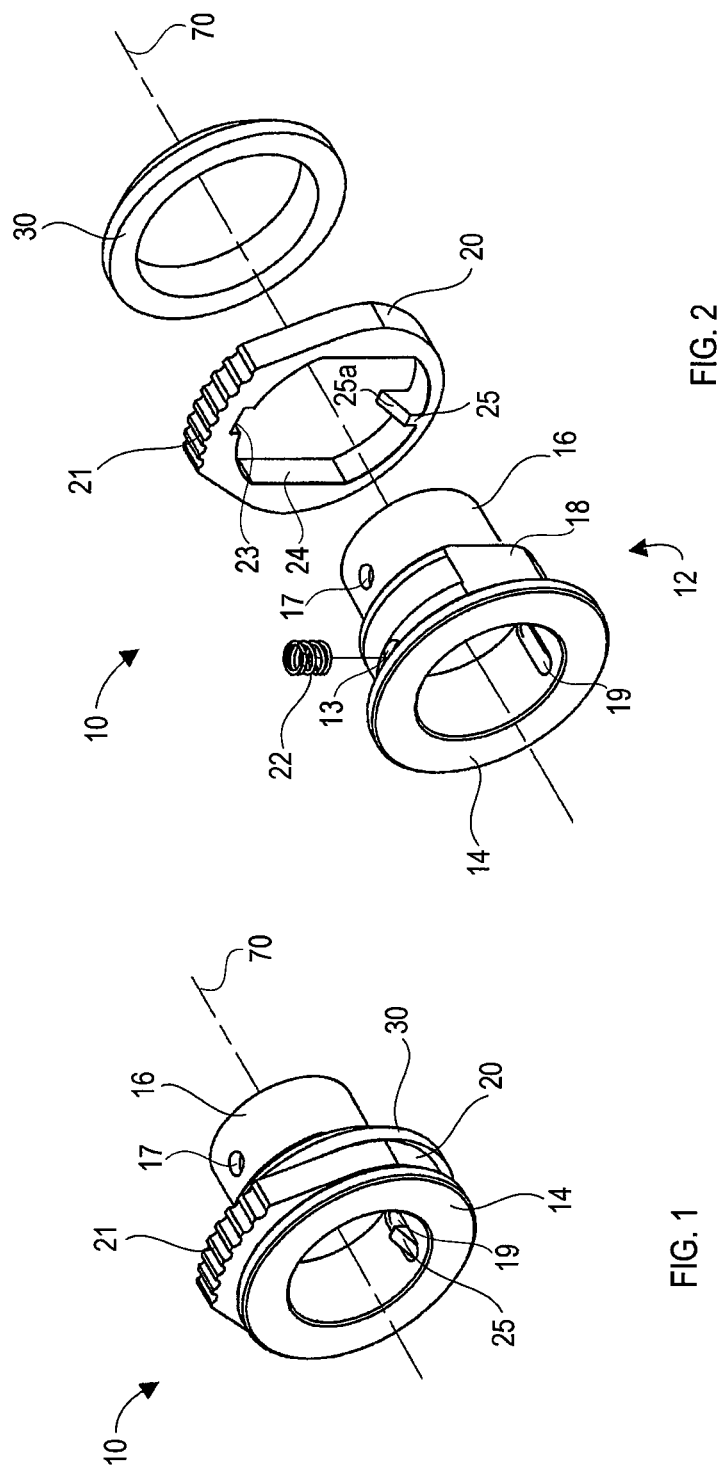

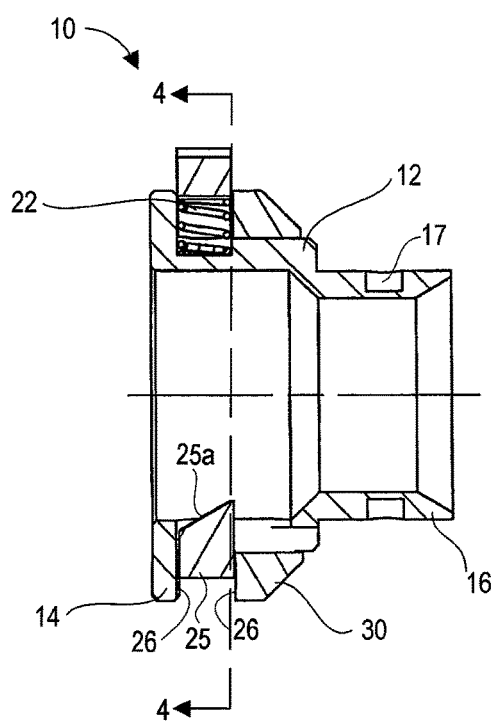 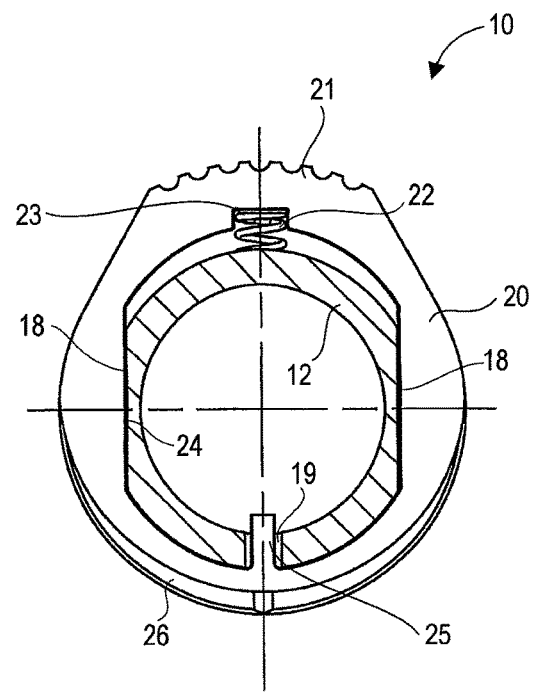
FIG. 3  FIG. 4
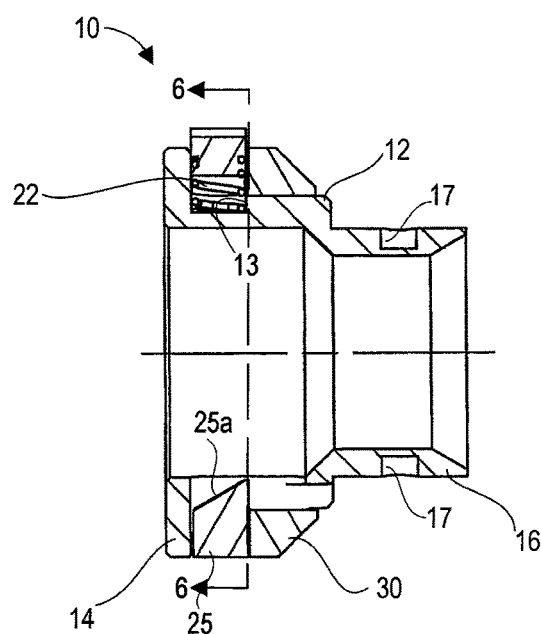 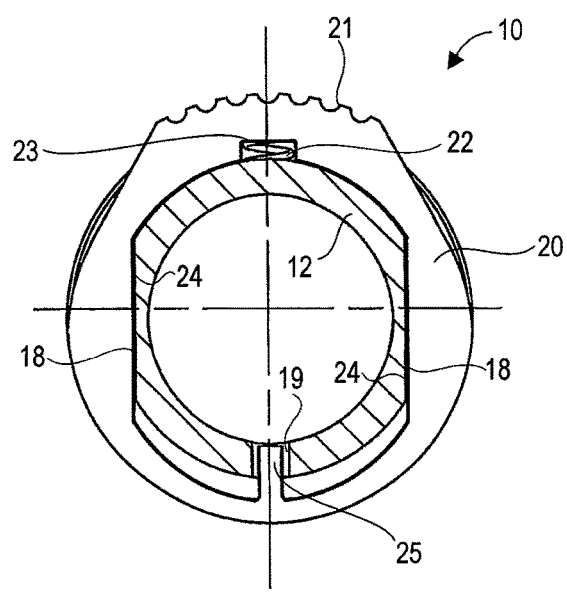
FIG. 5  FIG. 6

SNAP ADAPTER FOR TOOL COMPONENT

BACKGROUND OF THE INVENTION

1. Field of the Invention

The present invention relates in general to a cable stripping tool adapter, and more specifically to a tool which enables quick attachment to and removal from a common tool body multiple working components for stripping and/or cutting electrical, coaxial, fiber optic, and other types of cable.

2. Description of Related Art

Termination of a power or signal transmission cable involves stripping the outer jacket and insulation from the conductor core. There are many different combinations of primary and secondary cable sizes. This creates a need for an installer to be able to prepare numerous cable sizes based on application needs, cable manufacturer, and regional code requirements.

Some preparation tools utilize interchangeable components to allow the same basic tool frame to work across a range of application needs. Specifically sized components are used for different cable diameters within the same tool frame. Every time a worker switches to a different application, they must change the component in their tool. This has proven to be a tedious and time consuming task, and typically requires the use of outside tools to remove screws and bolts that connect the components to the tool frame.

SUMMARY OF THE INVENTION

Bearing in mind the problems and deficiencies of the prior art, it is therefore an object of the present invention to provide a tool which enables quick attachment to and removal from a common tool body multiple working components for stripping and/or cutting electrical, coaxial, fiber optic and other types of cable.

It is a further object of the present invention to provide an adapter with one end designed for attachment to a wire stripping tool body, and the other end designed for the quick attachment and release of a component containing a blade for stripping a wire of a desired diameter.

It is another object of the present invention to provide a snap adapter that allows for a method of tool component interchangeability that does not require the use of outside tools.

It is yet another object of the present invention to provide a snap adapter for a tool component that enables the use of a gloved hand to execute proper tool component transposition.

Still other objects and advantages will in part be obvious and will in part be apparent from the specification.

The above and other objects, which will be apparent to those skilled in the art, are achieved in the present invention which is directed to a method for securing a component to a tool body. The method provides a tool body, a tool component, and an adapter. The adapter has a hollow body with a longitudinal axis, the hollow body having opposite ends. One end is sized for receiving a tool component, while the other is sized for insertion into a tool body. A slide member is between the adapter hollow body forward end and opposite rearward end. The slide member has a button portion for receiving manual force to depress the slide member, a spring surface for receiving a spring, at least one bearing flat for transmitting torque between the slide member and adapter body, and a pin for securing the tool component into the adapter. A spring is inserted between the spring surface and the adapter forward end. The spring transmits sufficient force to move the pin into engagement with the tool component after removal of the manual force. The method involves inserting the adapter into the tool body. The tool component is then inserted into the adapter. The tool component is aligned inside the hollow body of the adapter until the slide member pin inserts into an indentation on the surface of the tool component, securing together the tool component and adapter.

In an embodiment, the method further includes removal of the tool component from the adapter by exerting a manual force on the button portion of the slide member, retracting the pin from the indentation on the tool component, and pulling the tool component away from the adapter forward end to disconnect the tool component from the adapter. The slide member may encase the adapter hollow body. The method may still further provide the component having a bore for receiving a cable end and a blade within the bore for stripping or cutting an outer jacket of the cable.

The present invention further provides an adapter for securing a component to a tool. An adapter has a hollow body with a longitudinal axis, the hollow body having opposite ends. One end is sized for receiving a tool component, and the other is sized for insertion into a tool body. A slide member is disposed between the adapter ends and has a button portion for receiving a manual force to depress the slide member, a spring surface for receiving a spring, at least one bearing flat for transmitting torque between the slide member and adapter body, and a pin for securing the tool component into the adapter. A spring is inserted between the spring surface and the adapter forward end, the spring transmitting sufficient force to move the pin into engagement with the tool component after removal of the manual force.

In an embodiment, the pin may be tapered to allow for activation of the slide member to move upon insertion of the tool component. The pin may be activated to move by applying a manual force to the slide member. The slide member may also encase the adapter body. A retaining member may further hold the slide member in place on the adapter hollow body. This retaining member may substantially surround one of the forward end and opposite rearward end of the adapter hollow body.

The present invention may further provide a tool and adapter for quickly changing a working component of the tool. A tool has a tool body, the tool body having opposite ends, with one end being sized for receiving a working tool component. A working tool component has opposite ends, with one end being sized for insertion into the tool body. An adapter has a hollow body with a longitudinal axis, the hollow body having opposite ends. One end is sized for receiving the tool component, the other is sized for insertion into the tool body. A slide member is disposed between the adapter ends and has a button portion for receiving a manual force to depress the slide member, a spring surface for receiving a spring, at least one bearing flat for transmitting torque between the slide member and the adapter body, and a pin for securing the tool component into the adapter. A spring is inserted between the spring surface and the adapter forward end, the spring transmitting sufficient force to move the pin into engagement with the tool component after removal of the manual force.

In an embodiment, the other end of the tool body has a projection for insertion into a drill. A slide member may encase the adapter body. The pin may be tapered to allow for activation of the slide member to move upon insertion of the tool component. The pin may further be activated to move by applying a manual force to the slide member. A retaining member may also hold the slide member in place on the adapter body.

The present invention may still further provide a method for using a component secured to a tool body to strip or cut a cable. The method provides a cable having an outer jacket encasing an inner core, a tool body, a tool component comprising a blade, and an adapter. The tool body has a forward end and an opposite rearward end, one of the forward end and opposite rearward end being sized for insertion of the adapter. The adapter has a hollow body and a longitudinal axis, the hollow body having opposite ends, one end being sized for receiving a tool component, the other being sized for insertion into a tool body. A slide member is disposed between the adapter hollow body forward end and opposite rearward end. The slide member has a button portion for receiving a manual force to depress the slide member, a spring surface for receiving a spring, at least one bearing flat for transmitting torque between the slide member and the adapter body, and a pin for securing the tool component into the adapter. A spring is inserted between the spring surface and the adapter forward end, the spring transmitting sufficient force to move the pin into engagement with the tool component after removal of the manual force. The method includes inserting the adapter into the tool body, then inserting the tool component into the adapter. The tool component is aligned inside the hollow body of the adapter until the slide member pin inserts into an indentation on the surface of the tool component, securing together the tool component and adapter. The cable is inserted into the tool component, then the tool body is rotated so the tool component blade strips or cuts the cable.

In an embodiment, the method further includes the other of the tool body forward end and opposite rearward end comprising a projection. The tool body projection is inserted into a drill, and the drill is used to create the rotational force needed to spin the component and strip the cable outer jacket from the cable to expose the inner core. The tool component may have a bore for receiving a cable end, the blade being disposed within the tool component bore, and the method may include inserting the cable into the tool component bore. Furthermore, removal of the tool component from the adapter includes exerting a manual force on the button portion of the slide member, retracting the pin from the indentation on the tool component, and pulling the tool component away from the adapter forward end to disconnect the tool component from the adapter.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 1 is a perspective view of an embodiment of the snap adapter of the present invention.

FIG. 2 is an exploded perspective view of the snap adapter embodiment of FIG. 1.

FIG. 3 is a side cross-sectional view of the snap adapter of FIG. 1 in the closed position.

FIG. 4 is a front cross-sectional view of the snap adapter of FIG. 1 in the closed position, along line 4-4 of FIG. 3.

FIG. 5 is a side cross-sectional view of the snap adapter of FIG. 1 in the open position.

FIG. 6 is a front cross-sectional view of the snap adapter of FIG. 1 in the open position, along line 6-6 of FIG. 5.

DESCRIPTION OF THE EMBODIMENT(S)

Figure 7:
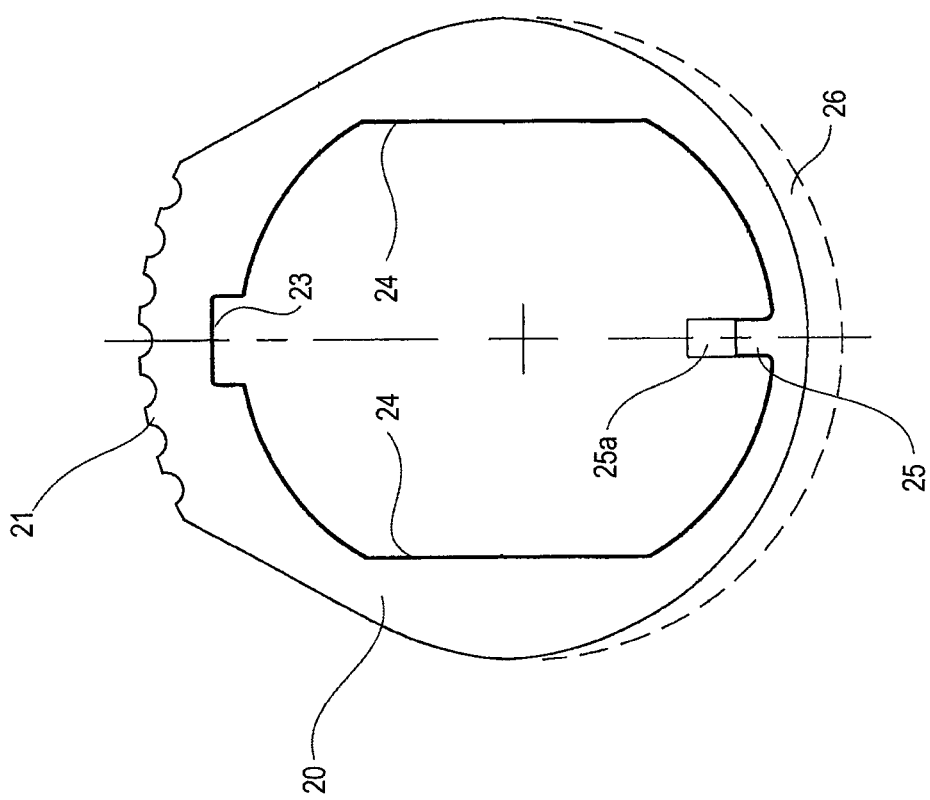
FIG. 7 is a front elevational view of the slide member incorporated in the snap adapter of FIG. 1.

In describing the embodiment(s) of the present invention, reference will be made herein to FIGS. 1-10 of the drawings in which like numerals refer to like features of the invention.

A snap adapter 10 of the present invention is used to provide a more efficient way of quickly changing a sized working component 50 to the end 44 of a wire stripping tool body 40. The snap adapter 10 comprises an adapter body 12, with a component end 14 of the adapter body 12 being sized for receiving and holding a working component 50, and an end 16 of the adapter body 12 sized for securing into the end 44 of wire stripping tool 40. The snap adapter 10 is configured to be compatible with several different tool body types, including but not limited to the Ripley 2×2 Plus (FIGS. 8-9) and Ripley 4×4 Plus® (FIG. 10) for securing one or more different components for stripping and/or cutting cables of different sizes or types.

Figure 8:
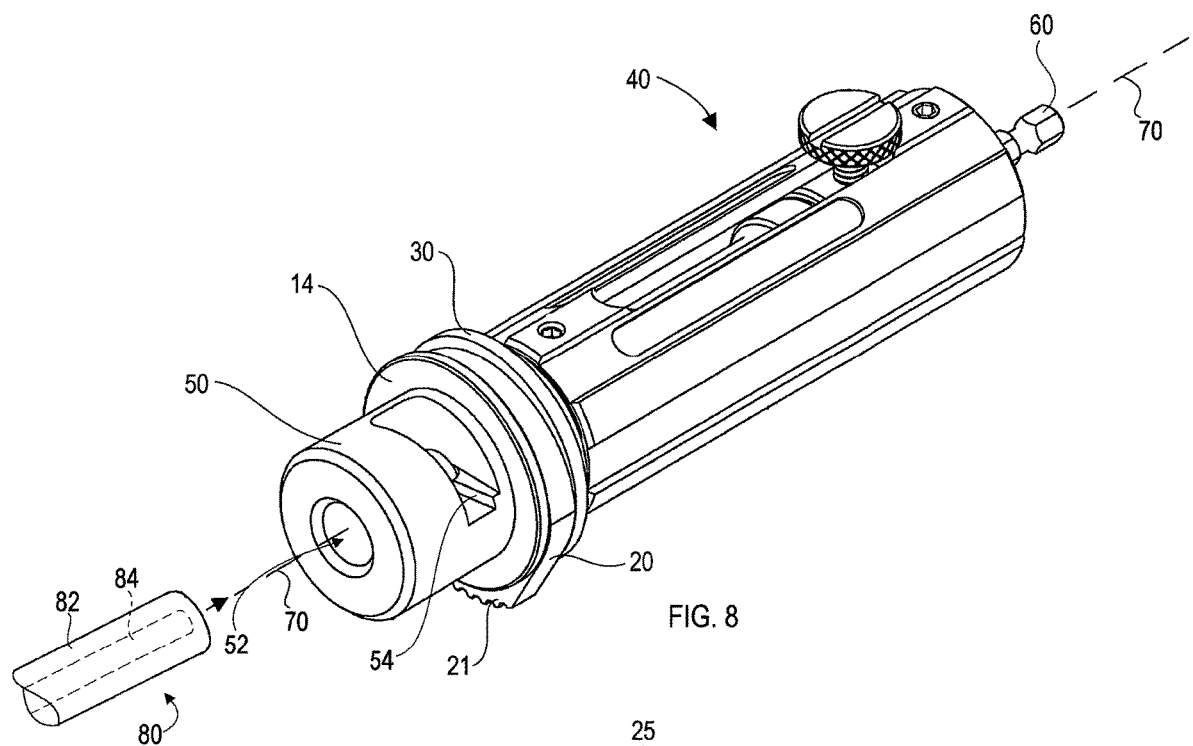
FIG. 8 is a perspective view of the snap adapter of FIG. 1 in use on an exemplary tool.
Figure 9:
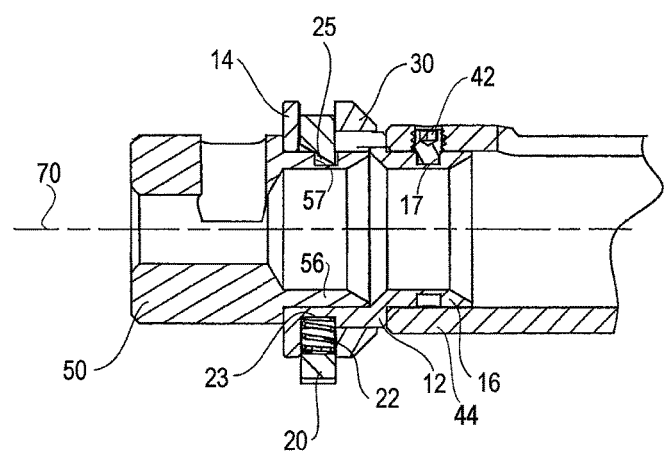
FIG. 9 is a side cross-sectional view of the snap adapter and exemplary tool assembly of FIG. 8.

As shown in FIGS. 8-9, the 2×2 Plus tool comprises a cylindrical tool body 40 with one female end 44 have a cylindrical opening sized for receiving the cylindrical tool end 16 of the snap adapter 10. The other end of the tool body 40 comprises a hexagonal-shaped node 60 projecting from its planar edge for insertion into a drill (not shown). This node 60 allows for drill-powered rotation of the tool about its longitudinal axis 70 when properly affixed to the drill, thus providing the proper motion needed for the attached component 50 to strip the outer jacket 82 from the cable 80.

Figure 10:
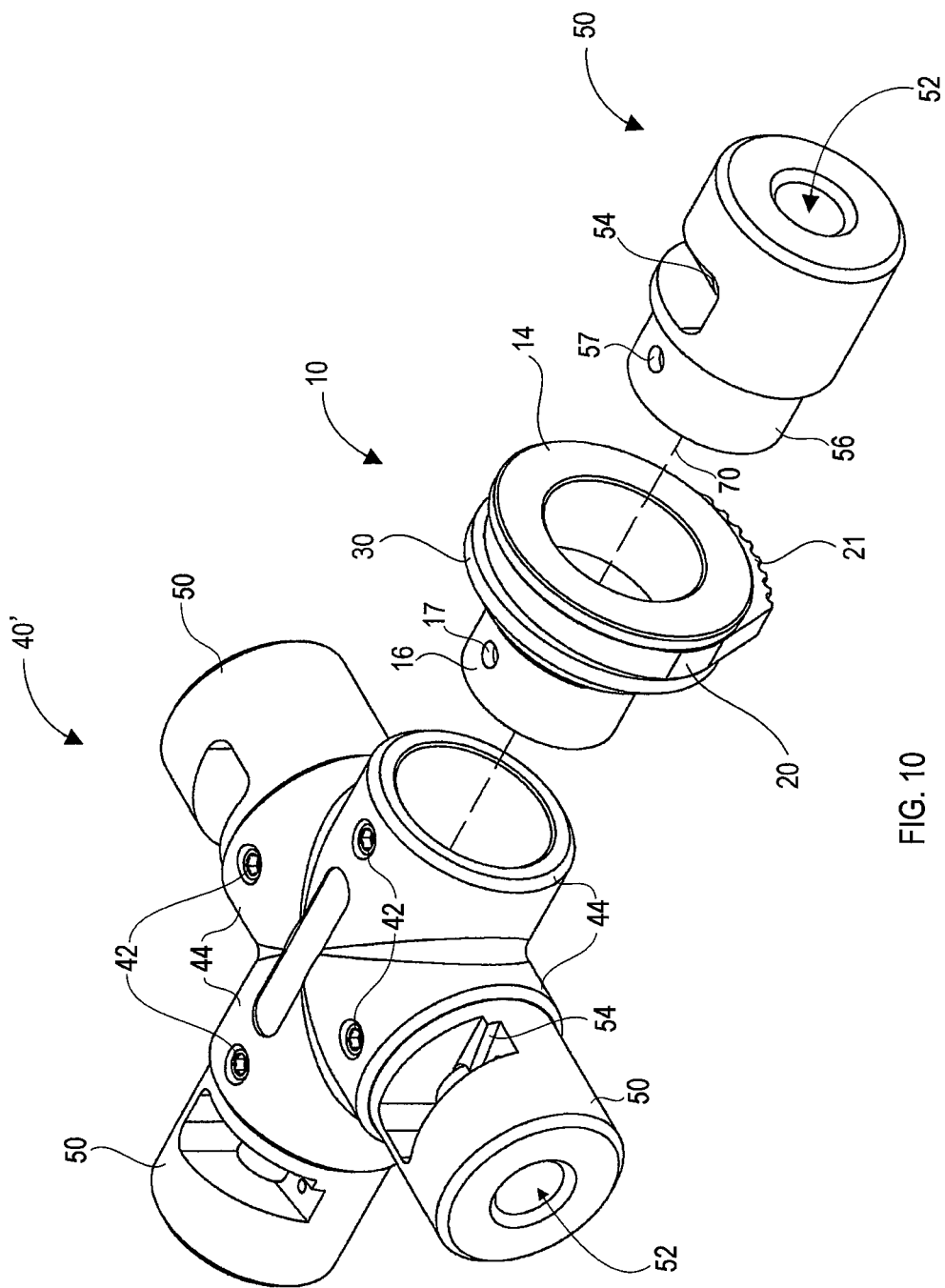
FIG. 10 is a perspective exploded view of the snap adapter of FIG. 1 in use on another exemplary tool.

FIG. 10 shows the Ripley 4×4 Plus® tool embodiment of the tool body 40' using the snap adapter 10 of the present invention to secure a component 50 for hand powered stripping of the outer jacket from a cable. The tool body 40' of this embodiment comes in a cross, or "X" shaped profile, with each planar edge being sized for receiving the tool end 16 of the snap adapter 10. Adapter tool body end 16 is sized to be received within any of the four end 44 openings in the tool body 44'. It is thus possible to attach four different sized components 50 to this particular tool body 40' at the same time. This tool in combination with the snap adapter 10 of the present invention especially is useful when the end-user is working with multiple sizes and types of cable (i.e. electrical, coaxial, Cat 5e, Cat 6, fiber optic, and the like). It eliminates the need for the end user to keep replacing the components attached to the tool body 40', therefore resulting in faster and more efficient results in cable-stripping tasks.

The snap adapter 10 attaches to the end 44 of the tool body 40/40' where cylindrical end 56 of a working component 50 would otherwise normally assemble. Component end 56 as shown has indentation or opening 57 which would normally receive a set screw 42 extending through an opening in the side of tool body end 44 to secure the component in place. As shown in FIGS. 8-10, the exemplary component 50 has a cylindrical body with a hollowed center, bore, or opening 52 for receiving a cable 80 end (FIG. 8). A portion of the planar surface of the component 50 cylindrical body is open into the hollowed center 52, and a blade 54 for stripping the outer jacket 82 off of a wire is affixed to the inside walls of the hollowed center 52 in a downward sloping angle. Insertion of a wire 80 end into the hollowed center 52 and rotation of the component 50 will create enough force for the blade 54 to cut, pierce and strip the cable jacket 82, exposing the wire or other core 84. A full 360° rotation of the component 50 will cut and remove the entirety of the cable jacket inserted into the component's 50 hollowed center 52, while the actual cable core 84 remains unscathed. Any other type of working component for cutting or stripping power- or data-carrying cable may be used in the present invention.

The snap adapter 10 of the present invention attaches at cylindrical end 16 to the opening in end 44 of the tool body 40/40' where a working component 50 would otherwise normally assemble, and end 16 is configured in a manner similar to component end 56. An indentation or opening 17 in end 16 receives set screw 42 in tool body end 44 to secure the adapter in place. At the opposite end 14 snap adapter 10 is configured to mate with the cylindrical end 56 of component 50, and the opening in end 14 is sized in a manner similar to the opening at end 44 of the tool body. Adapter 10 has a hollowed body with an inner diameter at end 14 where the end 56 of component 50 can be inserted in a tight-sliding fit, and then secured, as will be described further below. As shown in an exemplary embodiment in FIGS. 1-2, the snap adapter 10 is comprised of a generally cylindrical adapter body 12 with a component end 14 and a tool end 16, a slide member 20, a compression spring 22, and a retaining member 30. Adapter body 10 further includes a pin opening 19 on one surface of the opening in end 14 and on the exterior surface a spring relief opening 13 opposite the pin opening 19.

The slide member 20 is, in the embodiment shown, disposed between adapter ends 14 and 16 and moves with respect to adapter 10 in a direction normal to axis 70, and extends around and encompasses the body 12 of adapter 10. The retaining member 30 holds the slide member 20 in place on the adapter body 12 in a tight-sliding fit adjacent end 16, holding the slide member 20 between the component end 14 and the retaining member 30 (FIGS. 1 and 2). Its shape is generally round and ring-like with interior and exterior features configured for optimal functional and ergonomic operation. These features include pin 25, bearing flats 24, button 21, and a spring surface 23 as shown in FIG. 7.

The pin feature 25 extends within and protrudes through opening 19 in body 12 into the interior circumference of the slide member 20, on the opposite side of button portion 21. Force exerted on the button portion 21 allows for manual operation and movement of the pin 25. The pin 25 has a tapered entry point 25a in the form of a forward-facing ramp to allow components 50 to be inserted into the adapter 10 without the need to use the button 20. The ramp 25a will contact the leading edge of component end 56 and the pin 25 will be pushed and activated to move downward upon the continued insertion of the component 50. The angle of ramp 25a will not cause a jam or prevent a component 50 from being quickly assembled into the adapter 10. Upon full insertion of component end 56 into the opening in adapter end 14, pin 25 may slide upward into opening 57 in component end 56 to secure the component in place.

A compression spring flat surface 23 is disposed in a relief opening directly opposite the pin 25 on the interior of the slide member 20, and is aligned with spring relief opening 13 in adapter body 12. A compression spring 22 is disposed between surface 13 and opening 23 to urge button portion 20 away from adapter body 12 and pin 25 through opening 19 into the interior of the adapter body. Spring 22 is disposed directly beneath the button portion 21 to allow the user a tactical feel of the compression of the spring 22 and to align the force created by the spring 22 with the button portion 20 and pin 25. Once component end opening 57 is aligned with pin 25, the force of spring 22 causes the pin 25 to move into the opening.

Parallel bearing flats 24 along opposite sides of the inner surface of the slide member 20 slide along in contact with corresponding parallel bearing flats 18 on either side of the outer surface of adapter body 12. They are sufficiently long and broad to transmit torque from the adapter 10 to the pin feature 25, and provide the bearing surfaces for operation of the adapter 10.

The button portion 21 is the only part of the adapter 10 that the user needs to touch to remove the component 50. Its location approximately 180° opposed from the pin 25 enables the operator to exert force to move pin 25 along the line of movement of both button 20 and pin 25. Button portion 21 protrudes outside the diameter of the adapter 10 to allow for easy location and operation with a gloved hand, and may have a grooved/textured surface for a no-slip grip, which simultaneously makes it easier for an end user to locate.

The snap adapter 10 normally rests in the closed position as shown in FIGS. 3 and 4. When the component 50 is pressed into the tool body 40 by movement along axis 70, the leading edge of the end 56 of component 50 contacts a beveled pin 25 protruding from the slide member 20. The pushing force exerted onto the pin 25 which contacts the pin's sloped surface 25a naturally forces the slide member 20 into the open position (FIGS. 5-6). The end user can also physically push the button portion 21 of the slide member 20 to set the snap adapter 10 into the open position when they want to insert a component 50. To remove the component 50, the button portion 21 is depressed as shown in FIGS. 5 and 6 to remove pin 25 from component opening 57, and the component may be slid outward from adapter end 14.

When the slide member 20 is depressed in the open position, wherein button portion 21 is urged downward toward the adapter body 12 (FIG. 5), the exterior surface of slide member 12 may be sized so that it does not protrude beyond the adjacent surface of adapter body end 14 or retainer ring 30. When the button portion 21 is released and spring 22 urges it away from the adapter body, a recessed relief or clearance arc 26 is created opposite the button portion 21 on the exterior of the slide member 20, between adapter body end 14 or retainer ring 30 (FIGS. 3, 4 and 7). This allows for the user's fingers to squeeze directly normal to and across the axis 70 of the tool 40 and not limit the downward movement of the adapter 10. It also is sized to be flush with the diameter of the adapter 10 once the button is pressed so it doesn't protrude outside the envelope of the tool 40. This avoids confusion over which side is the operating button portion 21.

The adapter 10 provides an easily operable device through which all other components may connect to a common tool body. The adapter 10 allows for proper rotational alignment of the component and torque transmission between the component and the tool body.

The overall construction of the snap adapter 10 is modular as shown in FIGS. 8-10. The design allows for the end user to convert any standard tools that were originally designed to work with a component 50 into a quick disconnect tool in accordance with the present invention.

The snap adapter 10 and method of operation of the present invention provides a one-piece snap button 20 with integrated pin 25 for strength, durability, and reliability; a ramped, non-rotating pin 25 for easy component 50 installation with no need for button 20 actuation to install component 50; and an ergonomic "push" operation to remove the component 50. Additionally, it is modular to allow conversion of tools from standard to quick disconnect operation.

Accordingly, the present invention may include one or more of the following features and advantages:

The snap adapter assembly of the present invention includes one end designed for attachment to a wire stripping tool body, and the other end designed for the quick attachment and release of a component containing a blade for stripping or cutting a wire of a desired diameter.

The snap adapter assembly of the present invention provides a method of component interchangeability that eliminates the need to use outside tools to secure the component.

The snap adapter assembly of the present invention enables the use of a gloved hand of the user to execute proper component transposition.

While the present invention has been particularly described, in conjunction with a specific preferred embodiment, it is evident that many alternatives, modifications, and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for securing a component to a tool body, the method comprising:
   providing a tool body;
   providing a tool component;
   providing an adapter with a hollow body having a longitudinal axis, the hollow body having opposite ends, one end being sized for receiving the tool component, the other end being sized for insertion into the tool body, a slide member between a forward end and an opposite rearward end of the hollow body, the slide member having a button portion for receiving manual force to depress the slide member, a spring surface for receiving a spring, at least one bearing flat for transmitting torque between the slide member and the hollow body of the adapter, and a pin for securing the tool component into the adapter, the spring between the spring surface and the adapter forward end, the spring transmitting sufficient force to move the pin into engagement with the tool component after removal of the manual force;
   inserting the adapter into the tool body;
   inserting the tool component into the adapter; and
   aligning the tool component inside the hollow body of the adapter until the pin of the slide member inserts into an indentation on a surface of the tool component, securing together the tool component and adapter.

2. The method of claim 1 wherein the slide member encases the hollow body of the adapter.

3. The method of claim 1 wherein removal of the tool component from the adapter includes exerting a manual force on the button portion of the slide member, retracting the pin from the indentation on the tool component, and pulling the tool component away from the adapter hollow body forward end to disconnect the tool component from the adapter.

4. The method of claim 1 further providing the component having a bore for receiving a cable end and a blade within the bore for stripping or cutting an outer jacket of the cable.

5. A method for using a component secured to a tool body to strip or cut a cable, the method comprising:
   providing a cable having an outer jacket encasing an inner core;
   providing a tool body having a forward end and an opposite rearward end, one of the forward end and opposite rearward end being sized for insertion of an adapter;
   providing a tool component comprising a blade;
   providing an adapter with a hollow body having a longitudinal axis, the hollow body having opposite ends, one end being sized for receiving the tool component, the other end being sized for insertion into the tool body, a slide member between a forward end and an opposite rearward end of the hollow body, the slide member having a button portion for receiving manual force to depress the slide member, a spring surface for receiving a spring, at least one bearing flat for transmitting torque between the slide member and the hollow body of the adapter, and a pin for securing the tool component into the adapter, the spring between the spring surface and the adapter forward end, the spring transmitting sufficient force to move the pin into engagement with the tool component after removal of the manual force;
   inserting the adapter into the tool body;
   inserting the tool component into the adapter;
   aligning the tool component inside the hollow body of the adapter until the pin of the slide member inserts into an indentation on a surface of the tool component, securing together the tool component and the adapter;
   inserting the cable into the tool component; and
   rotating the tool body so the blade of the tool component strips or cuts the cable.

6. The method of claim 5 further including another end of the forward end and the opposite rearward end of the tool body comprising a projection, inserting the tool body projection into a drill, and using the drill to create the rotational force needed to spin the component and strip the cable outer jacket from the cable to expose the inner core.

7. The method of claim 5 further including removing the tool component from the adapter by exerting a manual force on the button portion of the slide member, retracting the pin from the indentation on the tool component, and pulling the tool component away from the adapter hollow body forward end to disconnect the tool component from the adapter.

8. The method of claim 5 wherein the tool component has a bore for receiving a cable end, the blade being disposed within the bore, and including inserting the cable into the tool component bore.

\* \* \* \* \*